US008879105B2

(12) United States Patent
Ueda et al.

(10) Patent No.: US 8,879,105 B2
(45) Date of Patent: *Nov. 4, 2014

(54) INFORMATION PROCESSING METHOD, INFORMATION PROCESSING APPARATUS AND PROGRAM FOR OBTAINING IMAGE GENERATION DATA BASED ON SPECIFIED IDENTIFICATION INFORMATION

(71) Applicant: Canon Kabushiki Kaisha, Tokyo (JP)

(72) Inventors: Akira Ueda, Kanagawa (JP); Kiyotaka Miura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/892,963

(22) Filed: May 13, 2013

(65) Prior Publication Data

US 2013/0242338 A1 Sep. 19, 2013

Related U.S. Application Data

(63) Continuation of application No. 13/182,043, filed on Jul. 13, 2011, now Pat. No. 8,456,683, which is a continuation of application No. 10/370,354, filed on Feb. 18, 2003, now Pat. No. 8,004,701.

(30) Foreign Application Priority Data

Feb. 19, 2002 (JP) .................................. 042129/2002
Jan. 28, 2003 (JP) .................................. 018824/2003

(51) Int. Cl.
*G06F 3/12* (2006.01)
(52) U.S. Cl.
CPC ............ *G06F 3/1237* (2013.01); *G06F 3/1203* (2013.01); *G06F 3/124* (2013.01)
USPC .......................................... 358/1.15; 358/1.1
(58) Field of Classification Search
None
See application file for complete search history.

(56) References Cited

U.S. PATENT DOCUMENTS

| 5,084,769 | A | | 1/1992 | Miura ........................... 358/403 |
| 5,287,194 | A | | 2/1994 | Lobiondo ...................... 358/296 |
| 6,115,132 | A | * | 9/2000 | Nakatsuma et al. ......... 358/1.14 |
| 6,115,739 | A | * | 9/2000 | Ogawa et al. ................. 709/215 |
| 6,597,469 | B1 | | 7/2003 | Kuroyanagi ................. 358/1.15 |
| 6,862,103 | B1 | | 3/2005 | Miura et al. ................. 358/1.15 |
| 6,862,583 | B1 | | 3/2005 | Mazzagatte et al. ............ 705/64 |
| 7,010,635 | B1 | | 3/2006 | Phillips et al. ................ 710/305 |
| 7,124,094 | B1 | * | 10/2006 | Kobayashi et al. ............. 705/64 |
| 7,161,697 | B2 | | 1/2007 | Yajima ......................... 358/1.15 |
| 2001/0003180 | A1 | * | 6/2001 | Sakai et al. ..................... 705/40 |
| 2001/0034774 | A1 | * | 10/2001 | Watanabe et al. ............. 709/217 |

(Continued)

FOREIGN PATENT DOCUMENTS

| JP | 11-313078 A | 11/1999 |
| JP | 2000-293461 A | 10/2000 |

*Primary Examiner* — Vincent Rudolph
(74) *Attorney, Agent, or Firm* — Fitzpatrick, Cella, Harper & Scinto

(57) ABSTRACT

An information processing system includes an information management apparatus that accepts image generation requests and an image generation section that generates image data, which is provided independently of the information management apparatus. The information management apparatus issues a job ID in response to a print request from a client, and transmits the job ID and a URL of the image generation apparatus to the client. Based on the URL, the client directly requests the image generation apparatus for image data corresponding to the job ID.

12 Claims, 9 Drawing Sheets

(56) References Cited

U.S. PATENT DOCUMENTS

| | | | |
|---|---|---|---|
| 2002/0048037 A1 | 4/2002 | Carbone | 358/1.14 |
| 2002/0063891 A1 | 5/2002 | Ueda et al. | 358/1.15 |
| 2002/0075510 A1 | 6/2002 | Martinez | 358/1.15 |
| 2002/0161831 A1* | 10/2002 | Nakaoka et al. | 709/203 |
| 2002/0176112 A1 | 11/2002 | Miura | 358/1.18 |
| 2003/0002072 A1 | 1/2003 | Berkema et al. | 358/1.15 |
| 2003/0154395 A1 | 8/2003 | Miura et al. | 713/200 |

\* cited by examiner

Fig. 12

| Job ID | Host Name | Status |
|---|---|---|
| 1 | Host 1 | Generation Completed |
| 2 | Host 3 | Being Generated |

1201 — 1202 — 1203 — 1204
1205 — row 1
1206 — row 2

INFORMATION PROCESSING METHOD, INFORMATION PROCESSING APPARATUS AND PROGRAM FOR OBTAINING IMAGE GENERATION DATA BASED ON SPECIFIED IDENTIFICATION INFORMATION

CROSS REFERENCE TO RELATED APPLICATION

The present application is a continuation of U.S. patent application Ser. No. 13/182,043, filed Jul. 13, 2003, which is a continuation of U.S. patent application Ser. No. 10/370,354, filed Feb. 18, 2003, which issued as U.S. Pat. No. 8,004,701 on Aug. 23, 2011. The entire disclosures these earlier applications are hereby incorporated by reference herein.

BACKGROUND OF THE INVENTION

1. Field of the Invention

The present invention relates to information processing systems, information processing apparatuses, information processing methods and programs.

2. Related Background Art

Accompanied by rapid development of the Internet and deployment of a large number of Web servers, more and more business transactions are conducted on the Web. By simply installing Web browsers that are capable of displaying and entering information on personal computers that are connected to the network, business transactions can be widely conducted through the Web browsers. Also, a Web server is present on the network in order to conduct business through Web browsers. Information is exchanged between the Web server and Web browsers that are clients. The Web server repeats necessary operations, such as, receiving information entered through the Web browsers, processing the information, and sending the processed results to the Web browsers. As a result, the users obtain the results of the data processing, and conduct the business.

With respect to printing processing, the following system is provided: the server executes an overlay processing using form data (template data) based on a print request that has been sent from a client, and delivers data that provides fine print results to the client.

However, in the printing processing that is conducted through Web browsers in the conventional system, a single control section is entirely responsible for accepting image generation requests from clients, controlling execution of image generation, and controlling delivery of generated slip image data.

In the Web system that is essentially asynchronously operated, management of all of these controls by a single control section makes the system more complex, statuses and data transfer states more difficult to be understood by the users, and the system management such as error handling processing more difficult.

SUMMARY OF THE INVENTION

The present invention has been made in view of the problems described above, and relates to a system in which acceptance of image generation requests by a request control section and generation of image data by an image generation section are separated from each other and independently controlled, and clients directly obtain generated image data from the image generation section. As a result, the request control section can devote its control to management of statuses of image data generation processing, and the processing load can be distributed between the request control section and the image generation section. In one embodiment, a plurality of image generation sections may be provided on individual apparatuses, and image data generation processings may be executed in parallel on the plurality of image generation sections.

Also, an embodiment of the present invention provides a device that allows clients to directly obtain image data from the image generation section.

Further, in accordance with another embodiment of the present invention, image data generation processings are managed by using job IDs that are unique in the system such that the status management is facilitated, and the progress of data generation processings in response to each image generation request can be readily grasped.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 12 shows a status management table.

DESCRIPTION OF PREFERRED EMBODIMENTS

An embodiment of the present invention is described below in detail with reference to the accompanying drawings.

Figure 1:
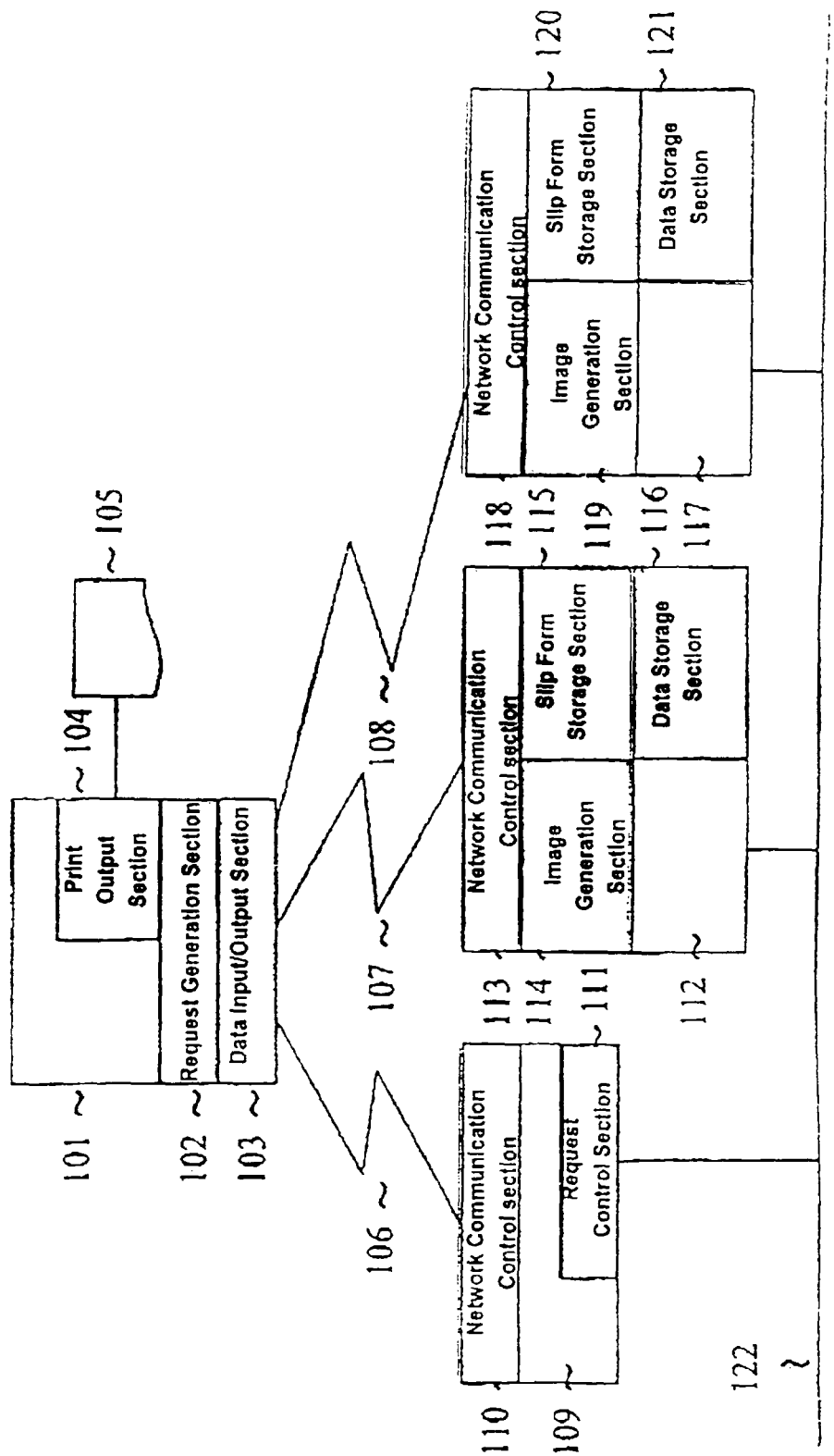
FIG. 1 is a block diagram of a exemplary structure of a network printing system.

FIG. 1 is a block diagram of a functional structure of a network print system that is a data processing system (e.g., an image generation system) in accordance with an embodiment of the present invention. The network print system includes a client apparatus 101 (hereafter referred to as a "client"). The client 101 may be composed of an information processing apparatus, such as, for example, a personal computer, a work station, a portable information processing console, a portable data assistants (PDA), a host computer, or the like. A request generation section 102 generates image generation requests in response to instructions by the user. An application 108 provides inputs and outputs in and from a server, and may include a Web browser. The application 103 has a function to transmit requests generated by the request generation section 102 and send the generated requests to the server, as well as a function to transmit requests for obtaining image data (which may also be referred to as "image data obtaining requests" below) to designated image generation apparatuses based on job IDs issued by the server, and a function to send image data received to a print output section 104. The print output section 104 converts the image data received into a format that can be outputted by a printer 105 connected to the print output section 104. The print output section 104 may be a printer driver.

A network 106 connects a request control apparatus 109 and the client 101. The network 106 can be any type of network that can accommodate communication procedures of the Web environments, such as, LAN, the Internet, wireless communication and the like. A network 107 connects an image generation apparatus 112 and the client 101. The network 107 may have a similar configuration as that of the network 106. A network 108 connects another image generation apparatus and the client 101 like the network 107. By the networks 107 and 108, the client is connected to a plurality of image generation apparatuses. In FIG. 1, the networks 106, 107 and 108 are shown independently from one another, but they can be composed of a single network. Also, the networks 106, 107 and 108 and another network 122 (to be described below) may be composed of a single network.

The request control apparatus 109 may be composed of an information processing apparatus, such as, for example, a personal computer, a work station, a portable information processing console, a portable data assistants (PDA), a host computer, or dm like. A network communication section 110 plays a role of at least a part of a Web server. A request control section 111 may be implemented as a part of the Web server, and issues job IDs in response to image generation requests from the client, and controls and manages all requests in the system.

The image generation apparatus 112 may be composed of an information processing apparatus, such as, for example, a personal computer, a work station, a portable information processing console, a portable data assistants (PDA), a host computer, or the like. A network communication section 113 is provided at the image generation apparatus 112. In other words, the image generation apparatus itself has a function of a Web server. An image generation section 114 generates slip image data according to stipulated formats. Image data may be raster image data or vector image data. A slip form storage section 115 stores slip forms that are necessary for generating images. A data storage section 116 stores data such as a data base including various business data. An image generation apparatus 117 that is similar to the image generation apparatus 112 is also connected to the client 101. This means that the system of the present embodiment includes a plurality of image generation apparatuses. The plurality of image generation apparatuses are provided independently of one another and may be operated independently, in a linked manner or in parallel with one another. The image generation apparatus 117 is provided with a network communication section 118, an image generation section 119, a slip form storage section 120 and a data storage section 121, which are similar to the network communication section 118, the image generation section 114, the slip form storage section 110 and the data storage section 116 provided at the image generation apparatus 112. The request control apparatus 109 and the image generation apparatuses 112 and 117 are connected via a network 122.

<Generation of Job IDs>

Figure 2:
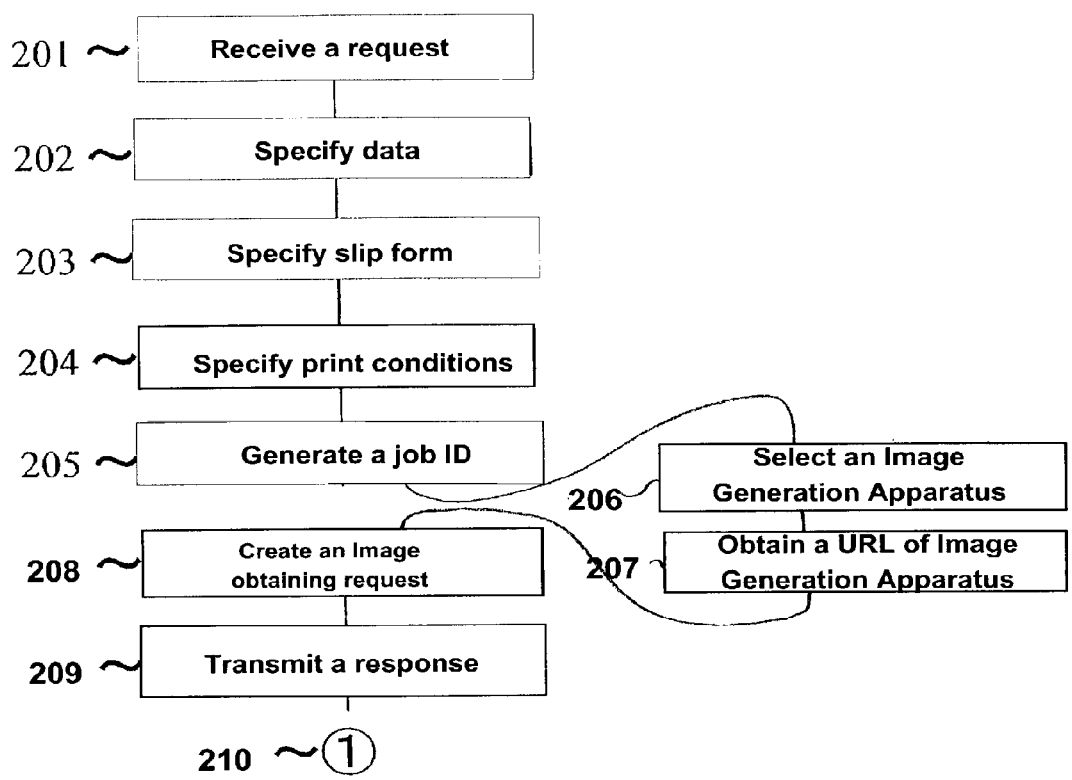
FIG. 2 shows a flowchart of processings performed by a request control apparatus to generate data for obtaining images.

FIG. 2 shows a flowchart of processings performed by the request control apparatus 109 to generate data for obtaining images upon receiving a print request from the client 101.

First in step 201, an HTTP request received through a browser or the like is analyzed; and in step 202, data necessary for generating images are specified. The data necessary for generating images may be data that is inputted by the user at the client, or data that is read from the data storage section 116.

Then in step 203, slip form data necessary for generating images (slip template data) is specified. In step 204, printer information at the time of executing prints and print conditions such as the number of prints are specified.

In step 205, an ID (identification information) for identifying the print request, which is unique within the system, is generated for the information specified in step 202 through step 204, and stored in a table as a job ID corresponding to the print request.

In step 206, an appropriate image generation apparatus is selected based on image generation apparatus information concerning image generation apparatuses that are in operation. In step 207, an address list (to be described below) of a URL of the selected image generation apparatus is obtained. In step 208, an image obtaining request data is created by combining the obtained URL and the job ID.

In step 209, the generated image obtaining request data is transmitted to the client. Then, processings at the client side are performed as indicated at 210 (processings in FIG. 8).

Figure 3:
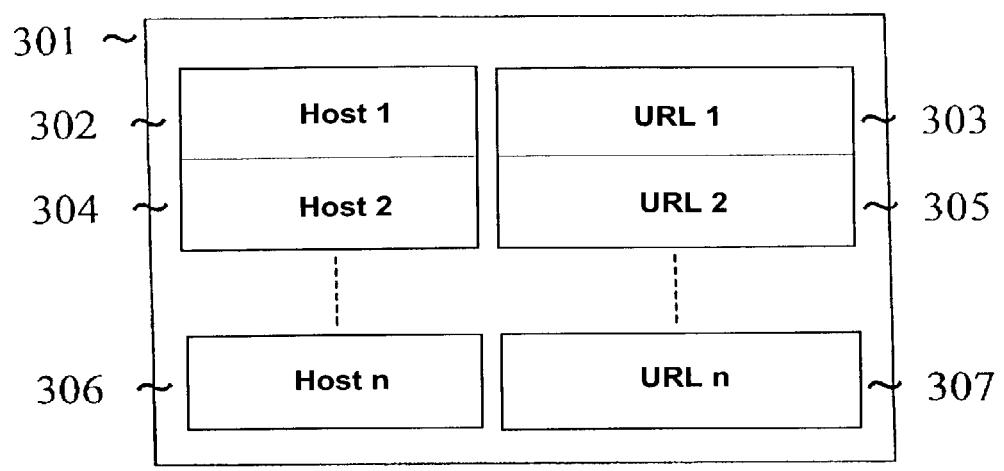
FIG. 3 shows an example of a composition of an address list of an image generation apparatus.

FIG. 3 shows an address list 801 of image generation apparatuses, which is retained and managed by the request control apparatus 109. The address list 801 stores host computer names (hereafter called as "host name") that identify a plurality of Corresponding image generation apparatuses and URLs (Uniform Resource Locators) that are addresses of the corresponding image generation apparatuses. Beside URLs, other addressee, such as, for example, IP (Internet Protocol) addresses that are used in a network may also be used as addresses of the image generation apparatuses.

The address 301 includes multiple host names Host 1, Host 2, . . . Host n (302, 304, . . . 306), and URLs URL 1, URL 2, . . . URLn (303, 305, . . . 307) corresponding to the host names Host 1, Host 2, . . . Host n, respectively.

When a host computer on the system starts as an image generation apparatus, the host computer notifies the request control apparatus 109 of its host name and URL, and the request control apparatus 109 stores the information (host name and URL) in the address list 301.

Figure 4:
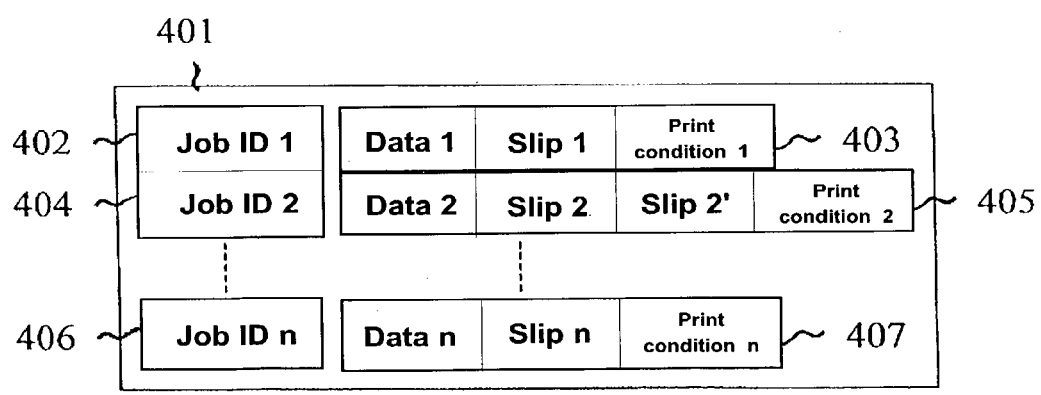
FIG. 4 shows an example of a composition of a table for managing job IDs.

FIG. 4 shows a table 401 for managing job IDs. This table is stored in the request control apparatus 109. The table 401 stores data necessary of image generation, slip form data, combinations of print conditions for each of a plurality of job IDs. The request control apparatus 109 stores in this table data epee fed or generated through steps 202 through 205.

For example, the table 401 stores a job ID 402 that is generated in step 205 in response to a specified print request, and a data set 403 corresponding to the job ID 404, which includes data specified through steps 202-204, slip form data and print conditions. The data set 408 may store data itself, or anything that indicates a place where data is stored, such as an address of the data stored.

A job ID 404 is generated in response to a print request that is different from the print request for the job ID 402. A data set 405 includes data, slip form data and print conditions corresponding to the job ID 404. The data set 406 indicates that a plurality of slip forms (i.e., Slip 1 and Slip 2) are required. FIG. 4 indicates that a plurality of job IDs, Job ID 1, Job ID2, . . . Job IDn (402, 404, . . . 406), and data sets containing data, slip form data and print conditions corresponding to the respective job IDs are registered in the table 401.

Figure 5:
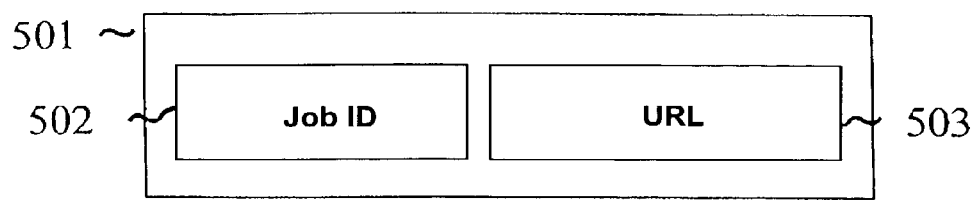
FIG. 5 shows contents of an image obtaining request.

FIG. 5 shows contents of image obtaining request data 501 that is generated in step 206. The image obtaining request data 501 contains a job ID 502 that is generated in step 205 in response to a request that is received in step 201, and a URL 503 of an image generation apparatus that generates image data for the print request indicated by the job ID 502. The request control apparatus 109 preferentially detects, among the plurality of image generation apparatuses under its management, an image generation apparatus that has an allowance for image generation processing capacity, obtains an URL of the detected image generation apparatus from the address list 301, and stores the obtained URL in the image obtaining request data 501.

<Obtaining Image Data>

Figure 6:
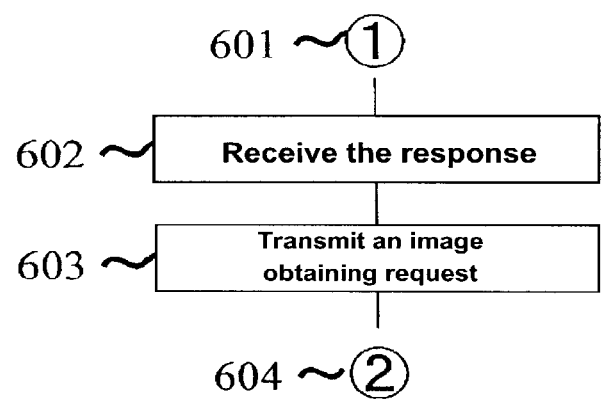
FIG. 6 is a flowchart of processings performed by a client to transmit an image obtaining request.

FIG. 6 is a flowchart of processings in which the client 101 that has received the image obtaining request data from the request control apparatus 109 transmits an image obtaining request based on the image obtaining request data to the image generation apparatus. The processings shown in FIG. 6 continue from the processings in FIG. 2 indicated at 601. In step 602, the client 101 receives the image obtaining request data that has been transmitted from the request control apparatus 109 in step 207. In step 608, the client 101 directly transmits to the designated image generation apparatus an image obtaining request based on the job ID and URL that are indicated in the received image obtaining request data. At this time, the job ID is transmitted with the image obtaining request. The processings shown in FIG. 6 continue to processings indicated at 604 that are performed on the image generation apparatus side (see FIG. 7).

Figure 7:
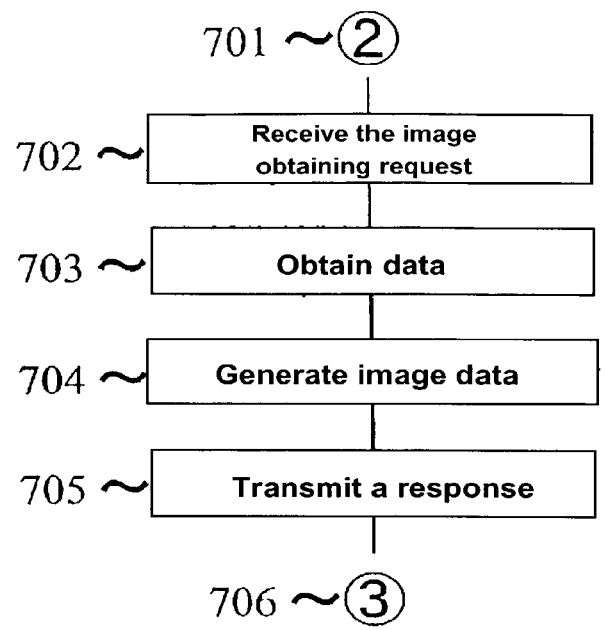
FIG. 7 is a flowchart of processings performed by an image generation apparatus to generate image data and transmit the image data to a client.

FIG. 7 is a flowchart of processings in which the image generation apparatus that receives the image obtaining request from the client 101 generates image data and transmits the generated image data to the client 101. The processings shown in FIG. 7 continue from the processings in FIG. 6 indicated at 701.

In step 702, the image generation apparatus receives the image obtaining request that has been transmitted from the client 101 in step 603. In step 703, based on the job ID received together with the image obtaining request, a corresponding job ID is searched from the table 401 that is managed by the request control apparatus 109, and data necessary for image generation, slip form data and print conditions corresponding to the job ID are obtained from the request control apparatus 109. More specifically, to obtain these data sets, the image generation apparatus transmits the job ID to the request control apparatus 109 and requests a search; and the request control apparatus 109 retrieves a corresponding job ID, and transmits data sets detected as a result of the search to the image generation apparatus.

In step 704, image data is generated based on the data sets obtained in step 703. For example, image data is generated by combining the data necessary for image generation and the slip form data, and further the image data is edited to meet the printing conditions.

In step 705, the image data generated in step 704 is transmitted to the client 101 as a response to the image obtaining request. The processings in FIG. 7 continue to processings indicated at 706 on the side of the client 101 (processings shown in FIG. 8).

Figure 8:
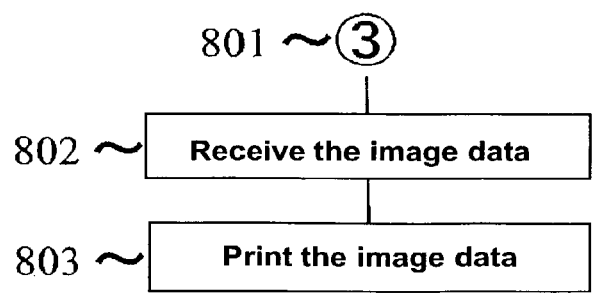
FIG. 8 is a flowchart of processing performed by a client to print the image data received.

FIG. 8 is a flowchart of processings in which the client 101 controls printing based on the image data received from the image generation apparatus. The processings shown in FIG. 8 continue from the processings in FIG. 7 indicated at 801.

In step 802, the client 101 receives the image data that has been transmitted from the image generation apparatus in step 705. In step 808 the print output section 104 converts the image data received into data in a printable format, and the converted data is transferred to the printer 105 where the data is printed.

The image generation apparatuses are equipped with the network communication control section 113 and 118, respectively, such that each of the image generation apparatuses has a function of a Web server. In the conventional system, when a client sends a print request to a Web server that solely exists in the system, sessions with the server need to be maintained until image data is obtained. However, in one aspect. In the system in accordance with the present embodiment, a client transmits a print request and an image obtaining request with independent HTTP requests to different apparatuses, as indicated in step 201 and step 702. For this reason, the time for maintaining sessions with the Web server can be shortened. Furthermore, since the request control apparatus and the image generation apparatus are separated from each other, the processing load is distributed between them.

Also, as indicated in step 205, a unique job ID is allocated to each print request. Therefore, even when a plurality of print requests occur, the client can obtain proper image data, and can clearly grasp the processing progress for each print request.

In the description above, the image generation apparatus starts creating image data in response to an image obtaining request from the client. However, the system may be arranged such that image data may be generated before an image obtaining request is received from a so that image data can be promptly transmitted to the client.

Figure 9:
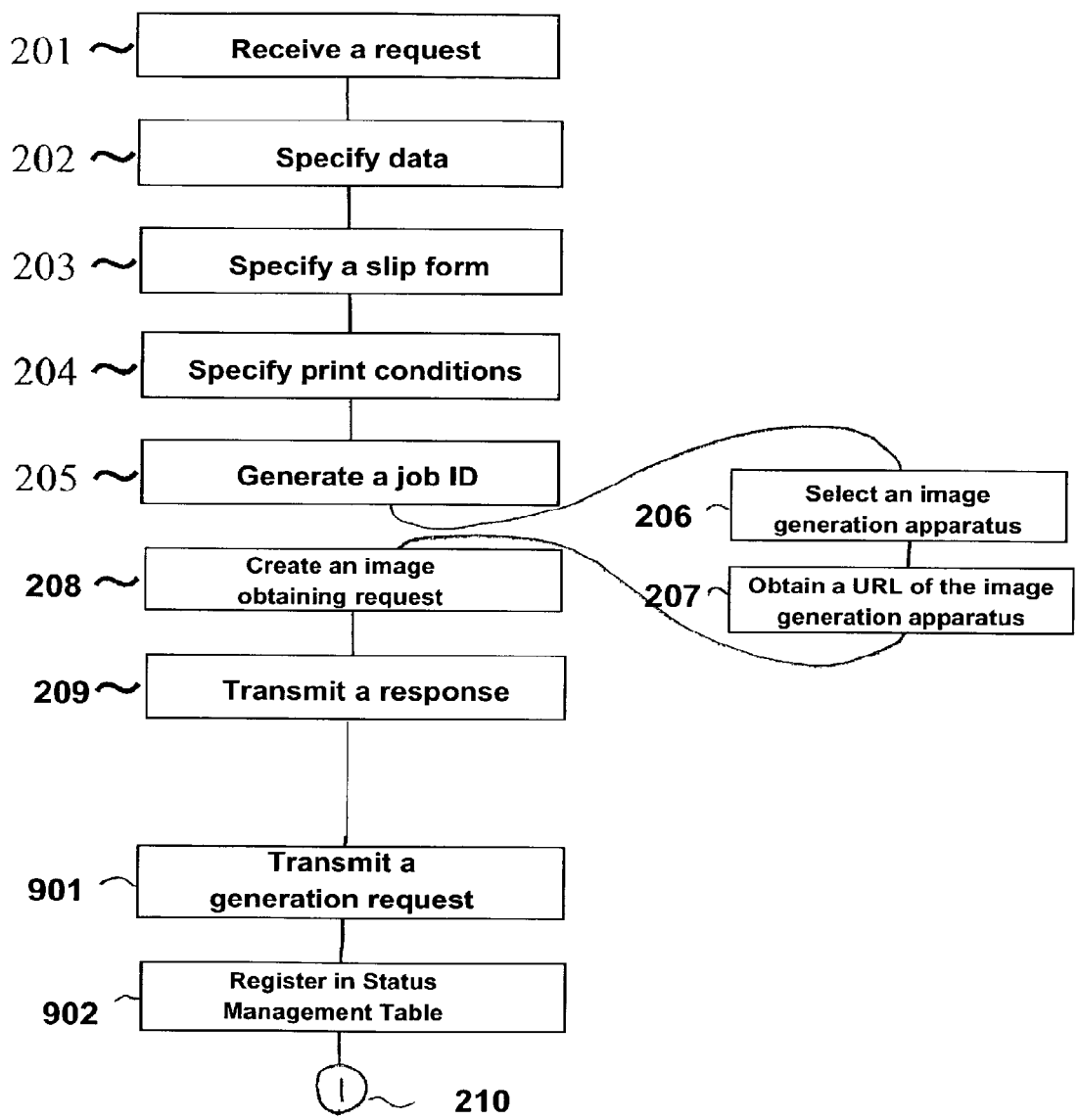
FIG. 9 is a flowchart of processing performed by a request control apparatus to generate data for obtaining images.

FIG. 9 shows a flowchart of processings which include steps 901 and 902 added to the processings in FIG. 2. In step 901, the request control apparatus 109 transmits an image data generation request to a selected image generation apparatus. At this time, a job ID generated in step 205 and data sets specified in steps 202-204 are transmitted together with the image data generation request to the selected image generation apparatus.

In step 902, the job ID and a host name of the selected image generation apparatus are registered in a status management table. Also, a status "Being Generated" is also registered.

FIG. 12 shows an example of a statue management table 1201 that is retained and managed by the request control apparatus 109. The statue management table 1201 stores a host name of an image generation apparatus that generates image data corresponding to a job ID, and a progress status of generating data corresponding to the job ID for each of a plurality of job IDs. Columns 1202, 1203 and 1204 of the status management table 1201 indicate job IDs, host names and progress statuses, respectively.

For example, a row 1205 of the status management table 1201 indicates that image data corresponding to a print request whose job ID is "1" has already been generated by an image generation apparatus whose host name is "Host 1".

The request control apparatus 109, in response to a status request from the client 101, returns to the client 101 information (host name and status information) corresponding to the job ID that is designated by the status request. By so doing, the client 101 can grasp the progress status of an image generation processing for the print request.

Figure 10:
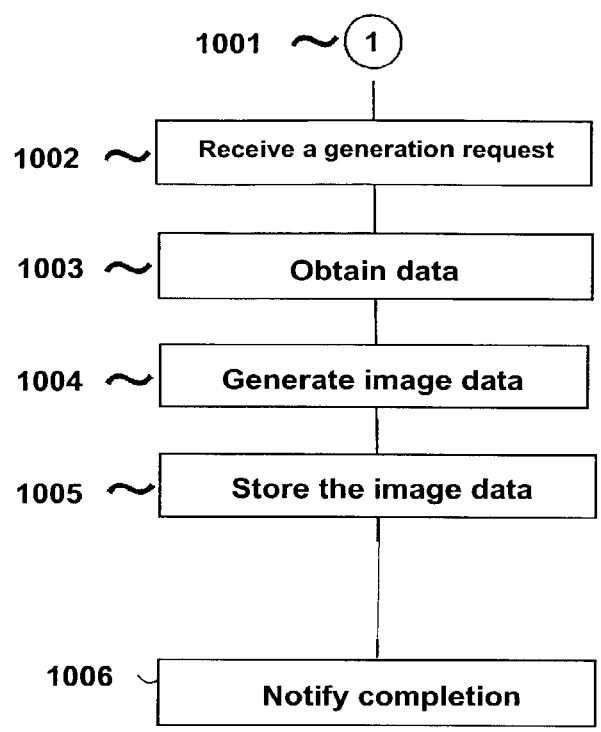
FIG. 10 is a flowchart of processings performed by an image generation apparatus to generate image data.

FIG. 10 is a flowchart of processings in which the image generation apparatus that has received the image data generation request from the request control apparatus 109 generates image data, and stores the generated image data. The processings shown in FIG. 10 continue from the processings in FIG. 9 indicated at 1001.

In step 1002, the image generation apparatus receives the image data generation request that has been sent from the request control apparatus 109 in step 901. In step 1003, the image generation apparatus obtains the job ID, data necessary for image generation, slip form data and print conditions received together with the image data generation request.

In step 1004, image data is generated based on the data obtained in step 1003. For example, image data is generated by combining the data necessary for image generation and the slip form data, and further the image data is edited to meet the printing conditions.

In step 1005, the image data generated in step 104 is correlated to the job ID and stored in the image data memory. In step 1006, completion of generating the image data together with the job ID is notified to the request control apparatus 109.

The request control apparatus 109, in response to the notice of completion of generating the image data, registers a status "Generation Completed" in the statue management table.

Figure 11:
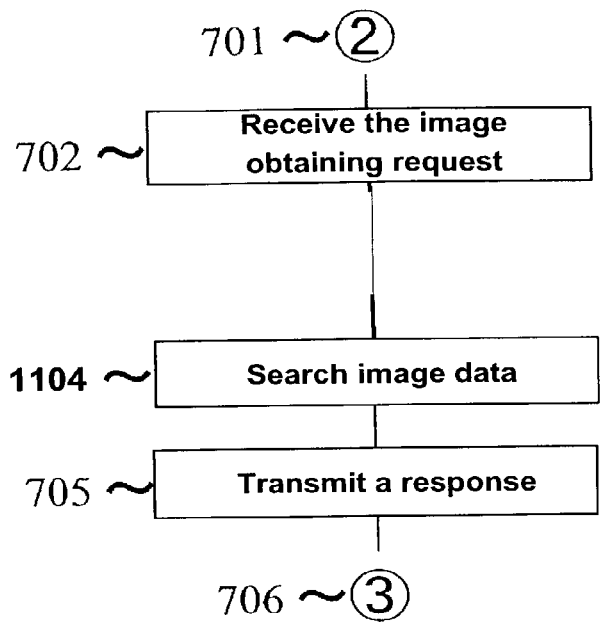
FIG. 11 is a flowchart of processings performed by an image generation apparatus to transmit image data to a client.

FIG. 11 is a flowchart of processings similar to those shown in FIG. 7 except that step 703 in FIG. 7 is deleted, and step 704 in FIG. 7 is modified. In step 1104, the image generation apparatus searches image data corresponding to the job ID from the image data memory based on the job ID received together with the image obtaining request. Then, in step 705, the image data detected as a result of the search is transmitted to the client 101.

As a result, the image generation apparatus can return image data quicker in response to an image obtaining request from a client.

The present invention can be achieved by having a storage medium that stores program codes of software that realize the functions of the embodiments described above supplied to a system or an apparatus, and by having a computer (or a CPU or an MPU) of the system or the apparatus read and execute the program codes stored in the storage medium.

In this case, the program codes themselves that are read from the storage medium realize the functions of the embodiment of the present invention, and the storage medium that stores the program codes constitute the present invention.

The storage medium to supply the program codes may be a flexible disk, a hard disk, an optical disk, an optical magnetic disk, a CD-ROM, a CD-R, a CD-RW, a magnetic tape, a nonvolatile memory card or a ROM.

Furthermore, the present invention is applicable not only when the program codes read by a computer are executed to realize the functions of the embodiments, but also when an operating system that operates on the computer performs a part or all of the actual processing based on the instructions contained in the program codes and thereby realizes the functions of the embodiments.

Moreover, the present invention is also applicable when the program codes that are read from the storage medium are written on a memory of an expansion board inserted into a computer or of an expansion unit connected to a computer, and a CPU provided on the expansion board or on the expansion unit performs a part or all of the actual processing based on the instructions contained in the program codes and thereby realizes the functions of the embodiments.

It is clear froth the description above that, in accordance with the present invention, an information processing apparatus that accepts print requests and an image generation apparatus that generates image data can be provided independently from each other on the system, such that the processing load can be distributed. Also by this system, a plurality of image generation apparatuses can be provided cm the system, and image data generation processings can be executed in parallel with one another.

Further, identification information to identify print requests is managed by the system in accordance with the present invention, such that statuses of print processing for individual print requests can be readily grasped.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system which comprises an information processing apparatus, an information management apparatus and an image generation apparatus, wherein
    the information management apparatus comprises a first transmission unit configured to transmit identification information to the information processing apparatus,
    the information processing apparatus comprises a second transmission unit configured to transmit the identification information received from the information management apparatus to the image generation apparatus, and
    the image generation apparatus comprises
    a third transmission unit configured to transmit the identification information received from the information processing apparatus to the information management apparatus,
    an obtaining unit configured to obtain image generation data based on the identification information, from the information management apparatus; and
    a generation unit configured to generate print data using the obtained image generation data,
    wherein the image generation data is correlated with the identification information, and
    wherein at least one of the first transmission unit, the second transmission unit, the third transmission unit, the obtaining unit and the generation unit is implemented, at least in part, by at least one hardware processor.

2. The system according to claim 1, wherein
    the information management apparatus comprises a reception unit configured to receive a print request from the information processing apparatus, and
    the first transmission unit of the information management apparatus transmits the identification information to the information processing apparatus, when the print request is received by the reception unit.

3. The system according to claim 1, wherein
    the information management apparatus comprises a reception unit configured to receive data necessary for image generation from the information processing apparatus, and
    the first transmission unit of the information management apparatus transmits the identification information to the information processing apparatus, when the data necessary for image generation is received by the reception unit.

4. The system according to claim 1, wherein the first transmission unit of the information management apparatus transmits the identification information and an address of the image generation apparatus to the information processing apparatus.

5. The system according to claim 1, wherein the image generation apparatus comprises a combining unit configured to combine data necessary for image generation and form data.

6. The system according to claim 1, wherein the image generation data is data to be printed.

7. A method for controlling a system which comprises an information processing apparatus, an information management apparatus and an image generation apparatus, comprising:
 transmitting identification information from the information management apparatus to the information processing apparatus;
 transmitting the identification information received from the information management apparatus, from the information processing apparatus to the image generation apparatus;
 transmitting the identification information received from the information processing apparatus, from the image generation apparatus to the information management apparatus;
 obtaining, in the image generation apparatus, image generation data based on the identification information, from the information management apparatus; and
 generating print data using the obtained image generation data,
 wherein the image generation data is correlated with the identification information.

8. The method according to claim 7, wherein
 a print request from the information processing apparatus is received by the information management apparatus, and
 the identification information is transmitted from the information management apparatus to the information processing apparatus, when the print request is received.

9. The method according to claim 7, wherein
 data necessary for image generation from the information processing apparatus is received by the information management apparatus, and
 the identification information is transmitted from the information management apparatus to the information processing apparatus, when the data necessary for image generation is received.

10. The method according to claim 7, wherein the identification information and an address of the image generation apparatus are transmitted from the information management apparatus to the information processing apparatus.

11. The method according to claim 7, wherein data necessary for image generation and form data are combined with each other by the image generation apparatus.

12. The method according to claim 7, wherein the image generation data is data to be printed.

\* \* \* \* \*